(12) United States Patent
Lee

(10) Patent No.: US 9,830,013 B2
(45) Date of Patent: Nov. 28, 2017

(54) TOUCH WINDOW

(71) Applicant: LG INNOTEK CO., LTD., Seoul (KR)

(72) Inventor: Seung Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 69 days.

(21) Appl. No.: 14/904,418

(22) PCT Filed: Jun. 10, 2014

(86) PCT No.: PCT/KR2014/005086
§ 371 (c)(1),
(2) Date: Jan. 11, 2016

(87) PCT Pub. No.: WO2015/008934
PCT Pub. Date: Jan. 22, 2015

(65) Prior Publication Data
US 2016/0170555 A1 Jun. 16, 2016

(30) Foreign Application Priority Data

Jul. 16, 2013 (KR) .................. 10-2013-0083665

(51) Int. Cl.
*G06F 3/041* (2006.01)
*G06F 3/044* (2006.01)

(52) U.S. Cl.
CPC ........... *G06F 3/0416* (2013.01); *G06F 3/044* (2013.01); *G06F 2203/04112* (2013.01)

(58) Field of Classification Search
CPC ................ G06F 3/0416; G06F 3/044; G06F 2203/04112

USPC ........................................................... 345/173
See application file for complete search history.

(56) References Cited

U.S. PATENT DOCUMENTS

| | | | |
|---|---|---|---|
| 2012/0032927 A1 | 2/2012 | Kim et al. | |
| 2012/0137907 A1* | 6/2012 | Jeong ............... | B41M 1/10 101/395 |
| 2013/0162596 A1* | 6/2013 | Kono ............... | G06F 3/044 345/174 |
| 2013/0169548 A1 | 7/2013 | Kim et al. | |

(Continued)

FOREIGN PATENT DOCUMENTS

| JP | 2008-129708 A | 6/2008 |
|---|---|---|
| KR | 10-2012-0012897 A | 2/2012 |

(Continued)

OTHER PUBLICATIONS

International Search Report dated Oct. 15, 2015 issued in Application No. PCT/KR2014/005086 (Full English Text).

*Primary Examiner* — Adam R Giesy
*Assistant Examiner* — Chineyere Wills-Burns
(74) *Attorney, Agent, or Firm* — Ked & Associates, LLP

(57) ABSTRACT

Disclosed is a touch window. The touch window includes a substrate, a sensing electrode on the substrate, and a wire to electrically connect the sensing electrode, and a dummy part is provided in the wire. The touch window includes a substrate, a sensing electrode on the substrate, and a wire to electrically connect the sensing electrode. The wire includes a first wire part and a second wire part adjacent to the first wire part, and the first wire part has a directionality different from a directionality of the second wire part.

20 Claims, 14 Drawing Sheets

(56) References Cited

U.S. PATENT DOCUMENTS

| | | | |
|---|---|---|---|
| 2014/0131075 A1* | 5/2014 | Jang | G06F 3/041 |
| | | | 174/255 |
| 2014/0216786 A1* | 8/2014 | Zhou | H05K 1/0296 |
| | | | 174/250 |
| 2014/0218636 A1* | 8/2014 | Gao | G06F 3/044 |
| | | | 349/12 |
| 2015/0145813 A1 | 5/2015 | Takiguchi et al. | |

FOREIGN PATENT DOCUMENTS

| KR | 10-2012-0138485 A | 12/2012 |
|---|---|---|
| KR | 10-2013-0053939 A | 5/2013 |
| KR | 10-2013-0078065 A | 7/2013 |
| WO | WO 2013/073299 A1 | 5/2013 |
| WO | WO 2013/099777 A1 | 7/2013 |

\* cited by examiner

【Figure 1】
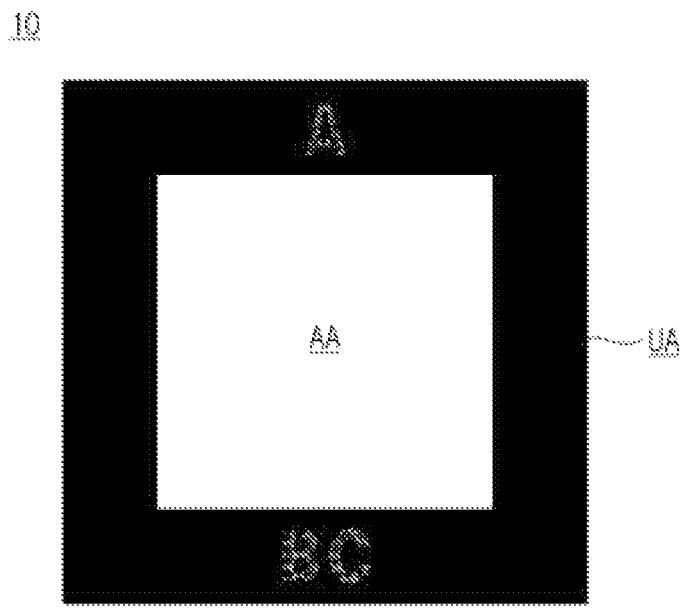
【Figure 2】
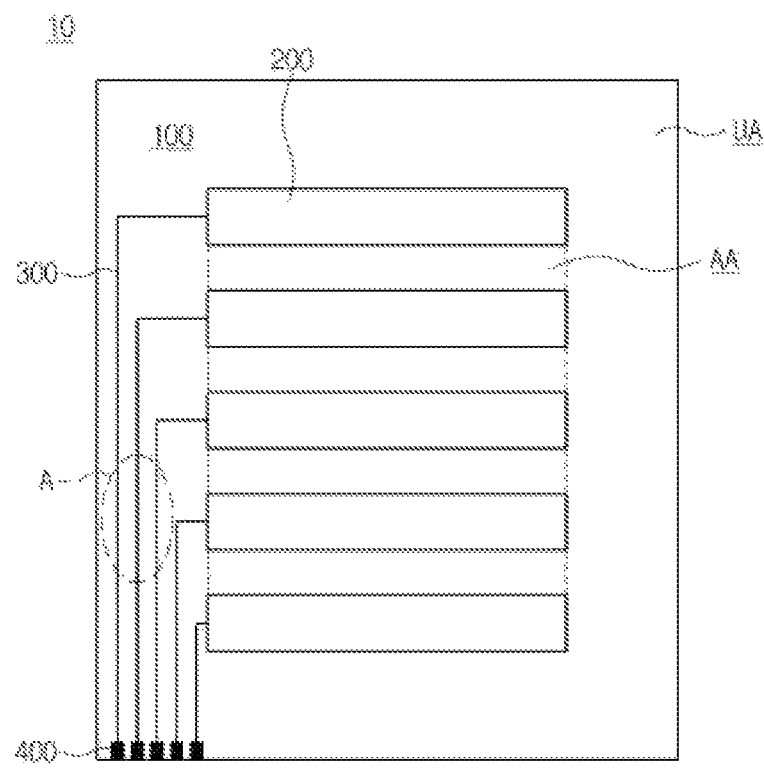

【Figure 3】
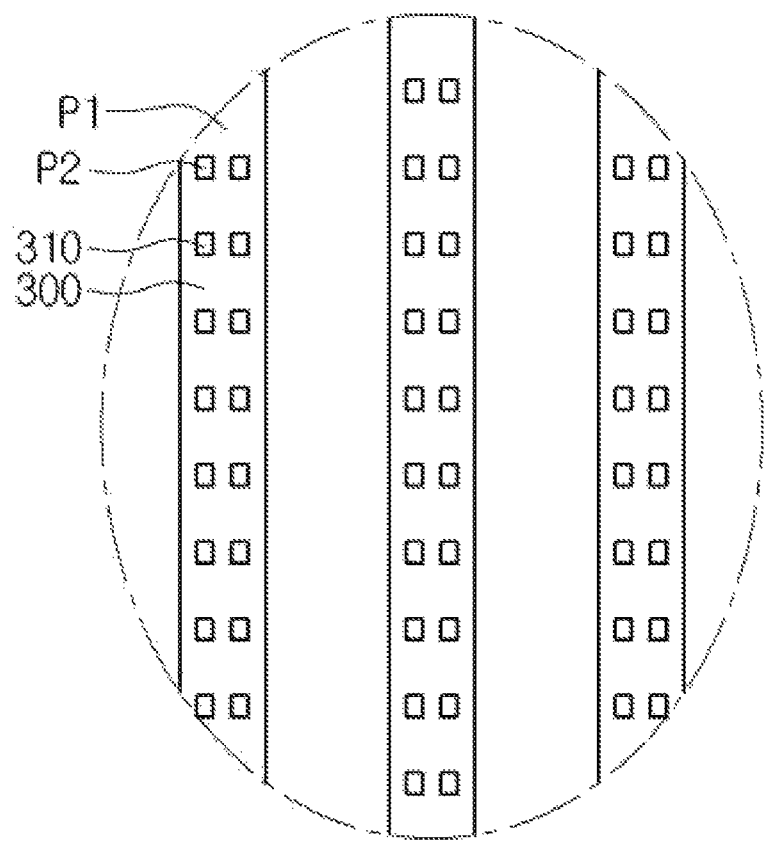
【Figure 4】
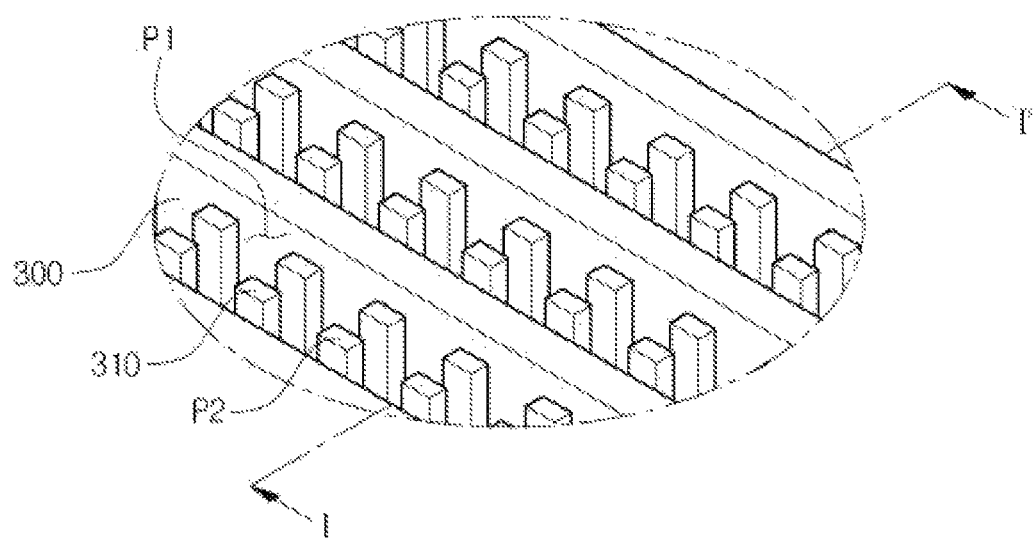

[Figure 5]
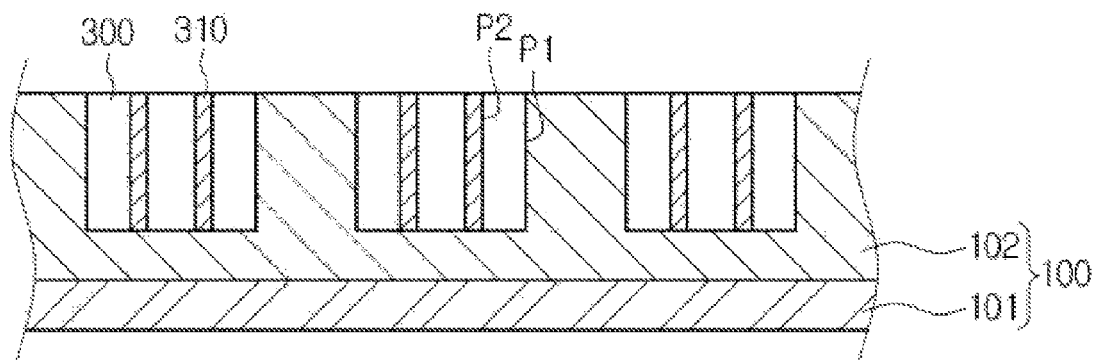
[Figure 6]
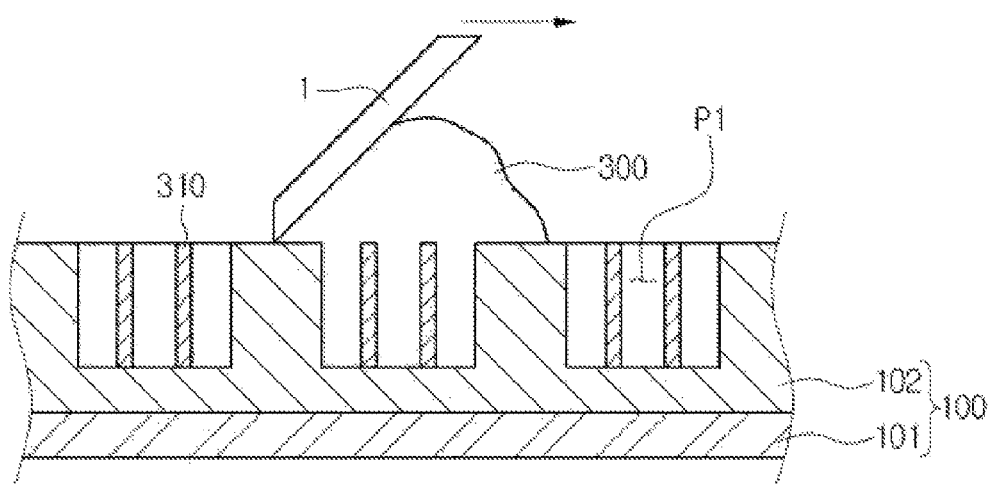

【Figure 7】
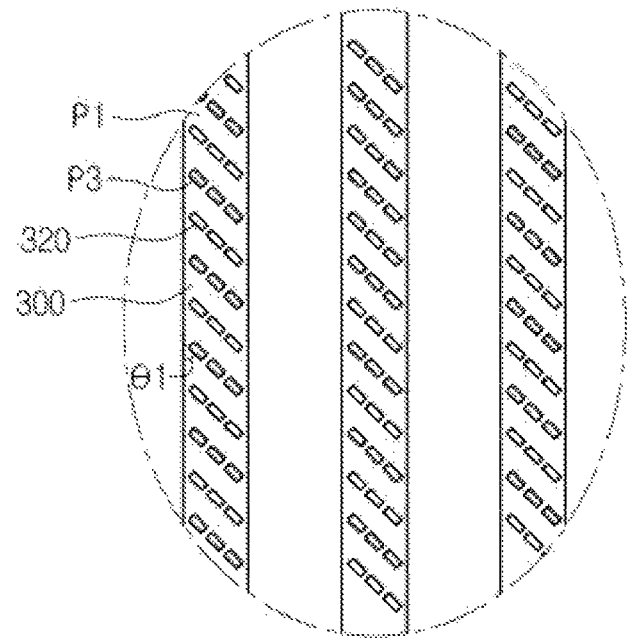
【Figure 8】
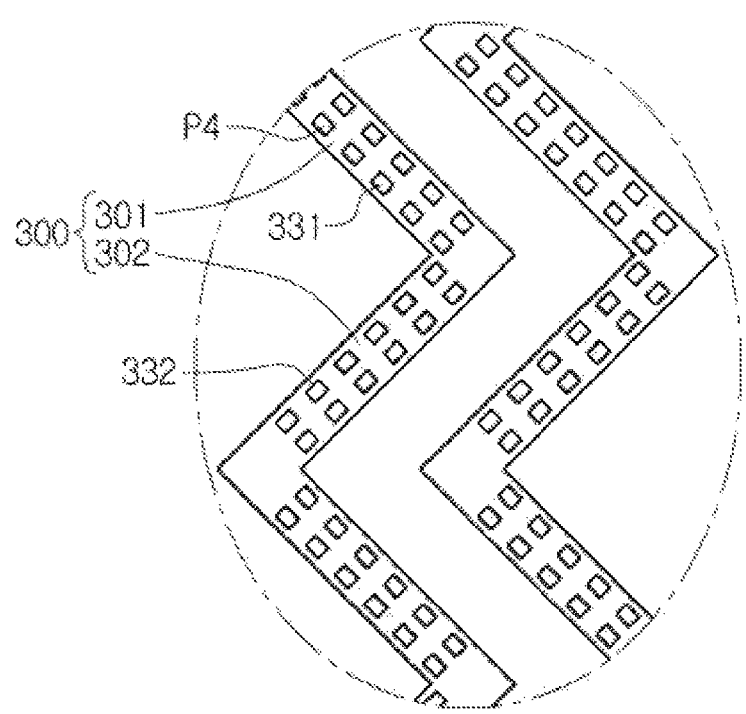

【Figure 9】
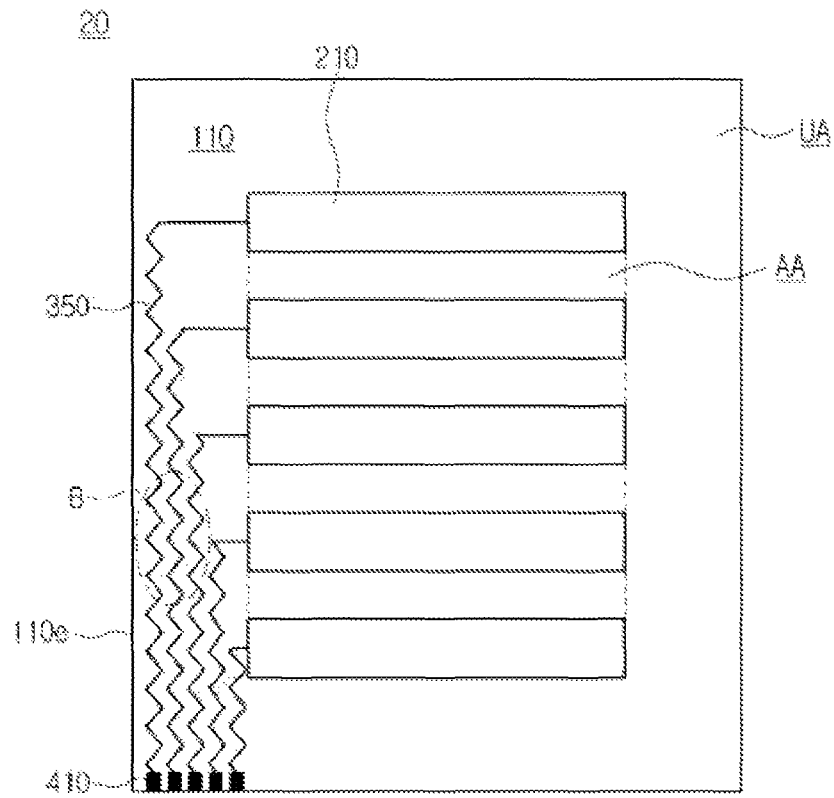
【Figure 10】
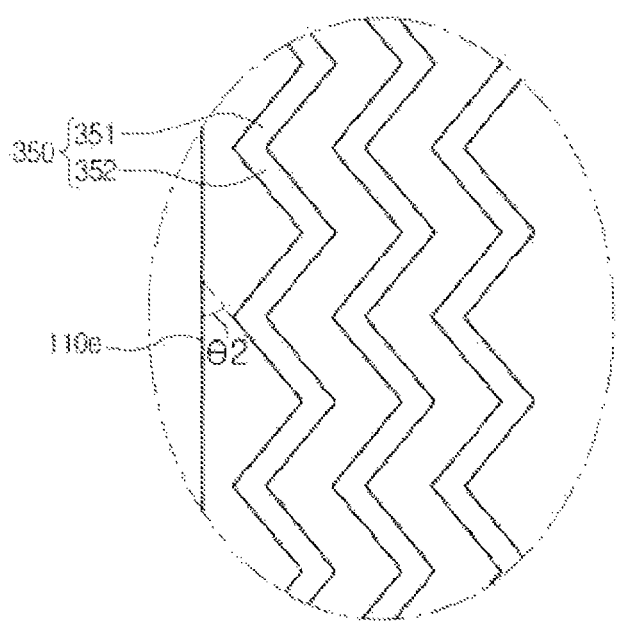

[Figure 11]
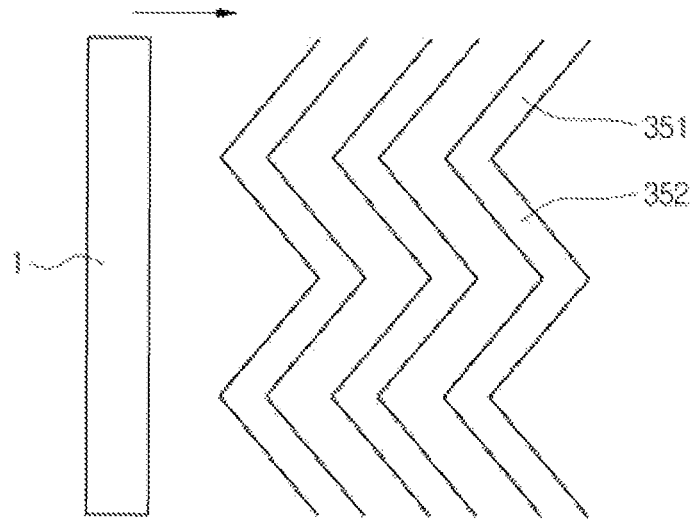
[Figure 12]
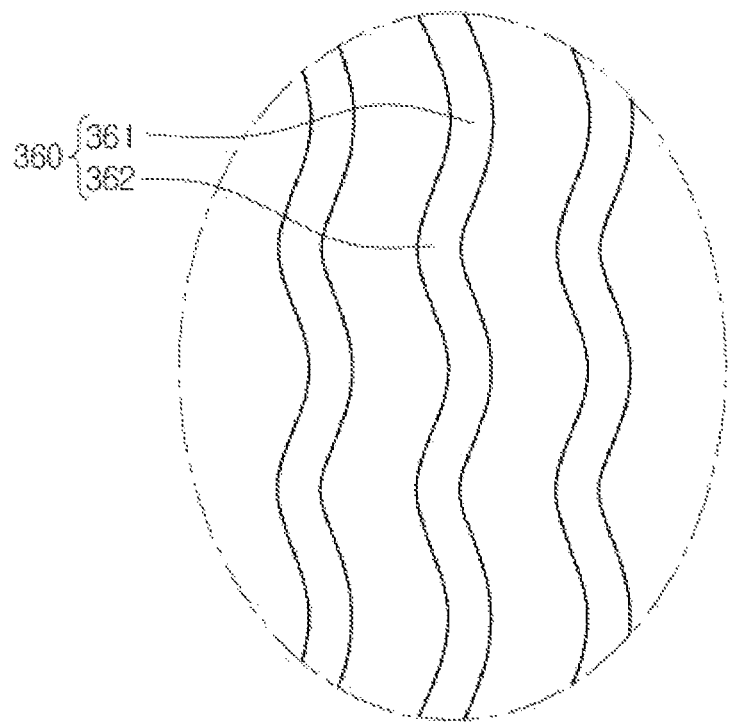

[Figure 13]
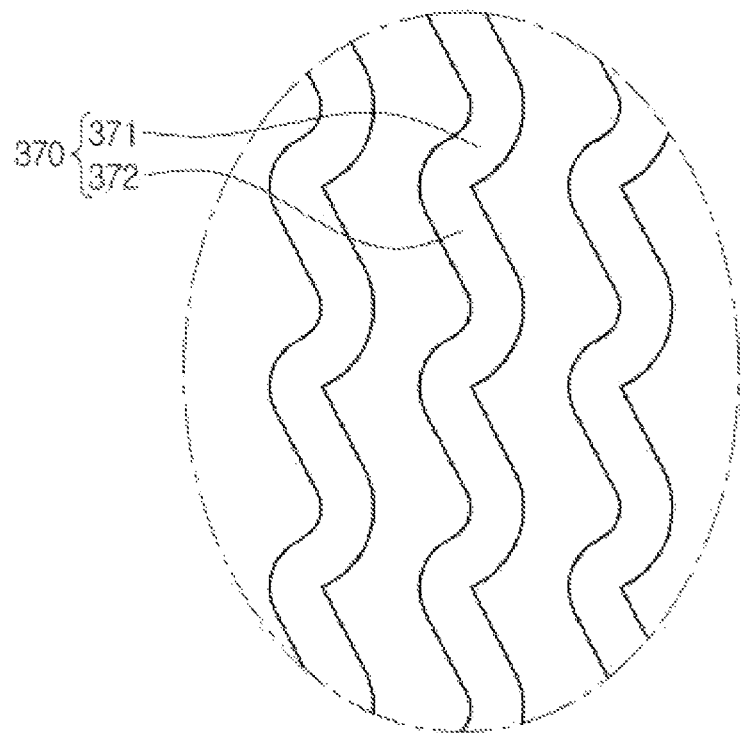
[Figure 14]
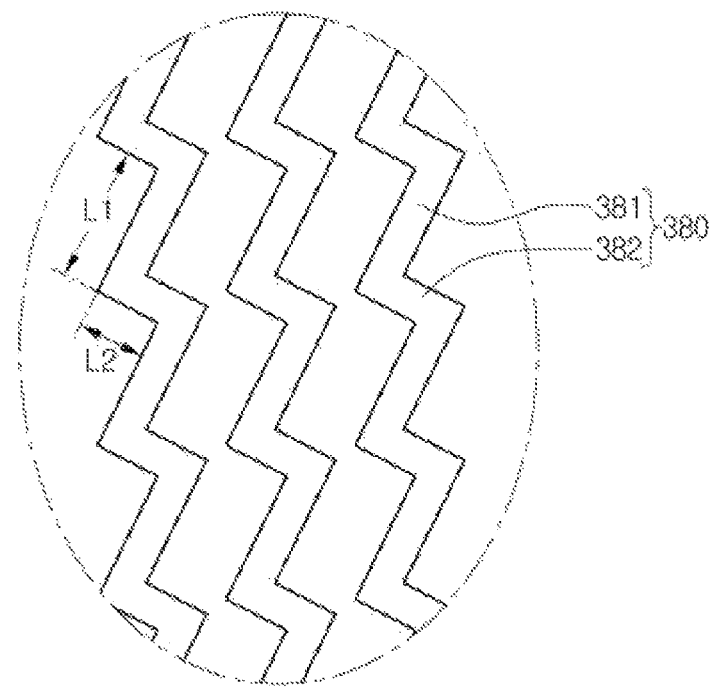

[Figure 15]
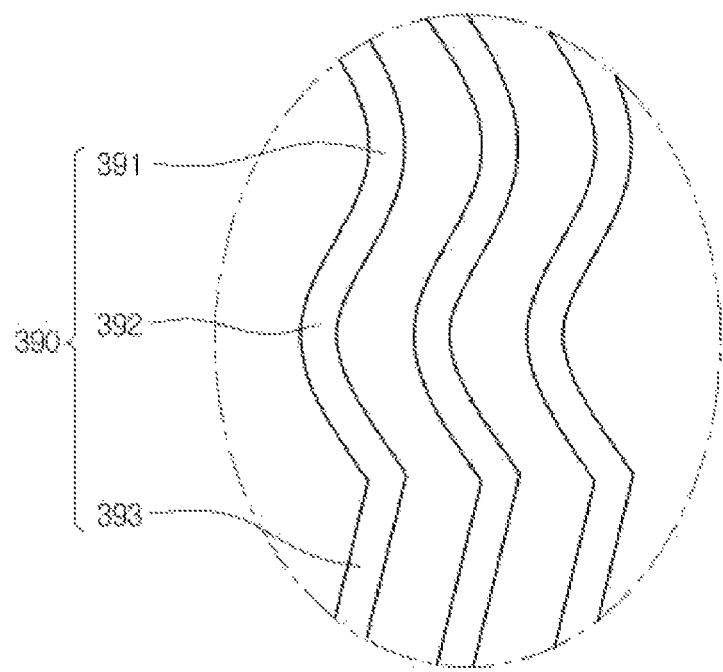

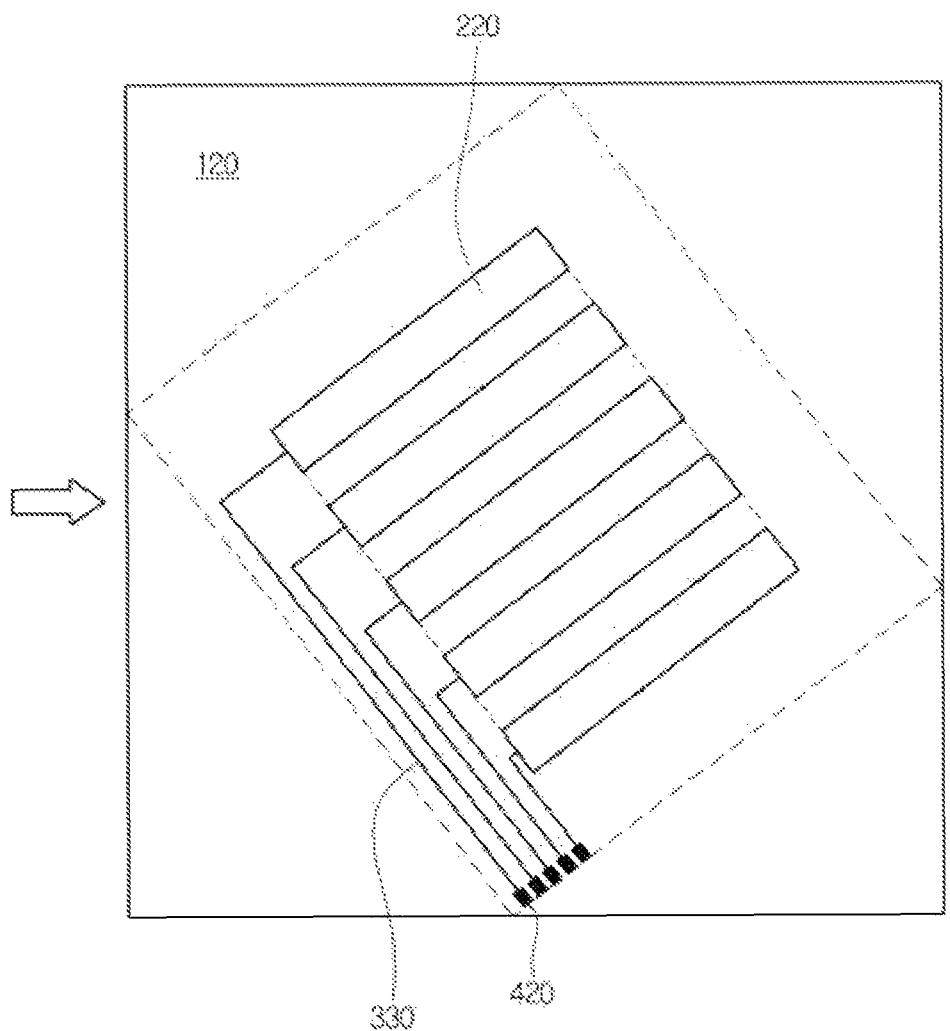
[Figure 16]

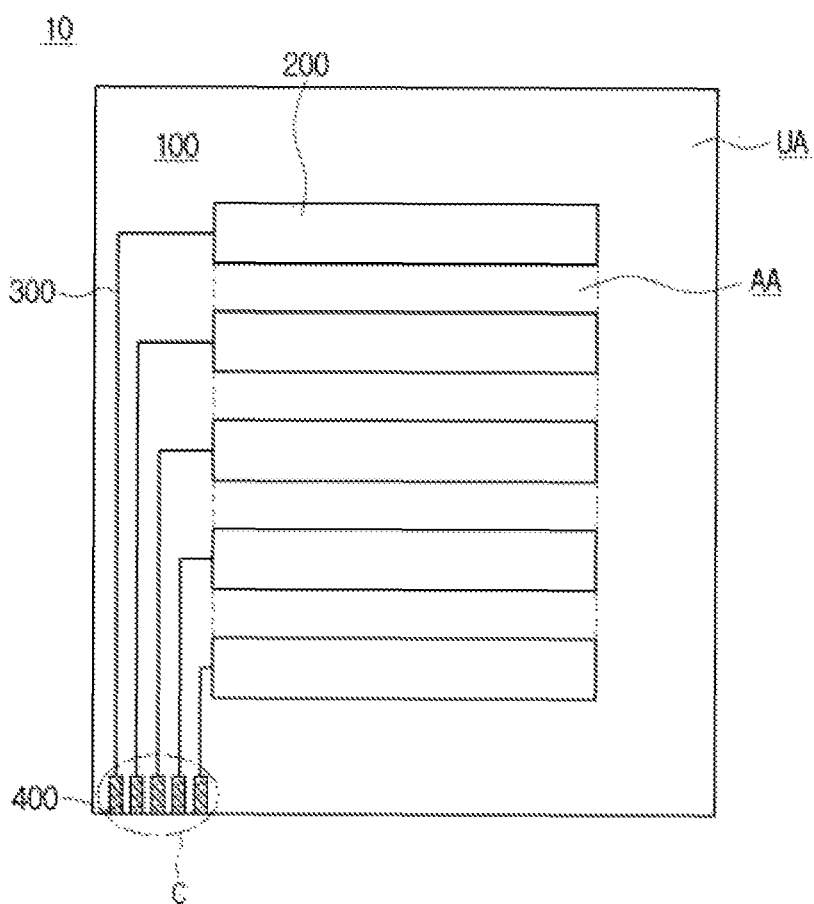
【Figure 17】

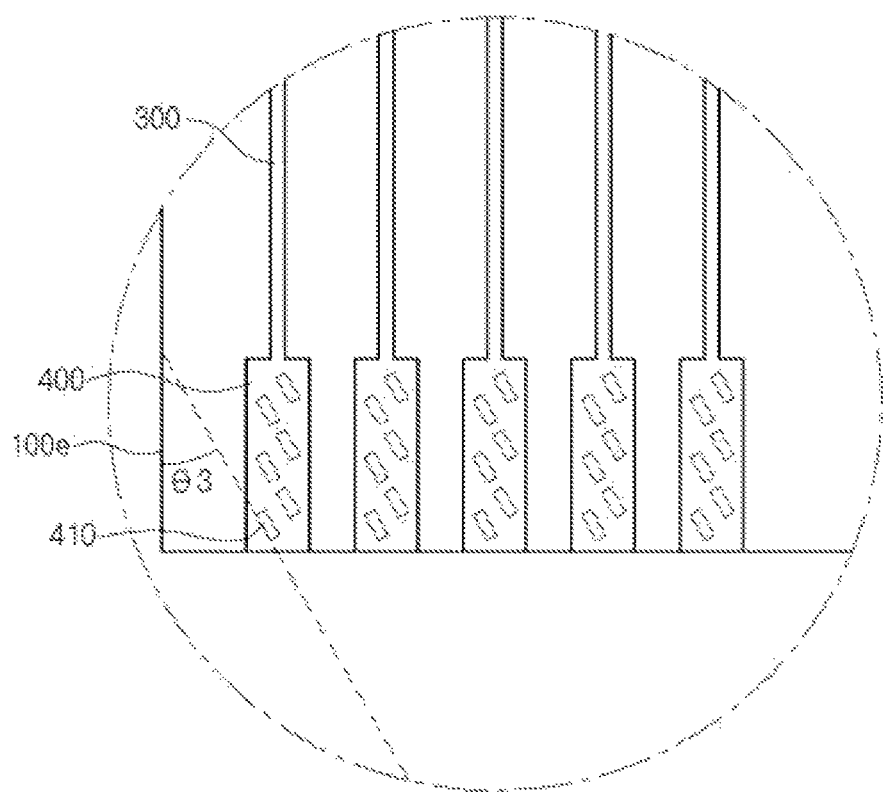
[Figure 18]

【Figure 19】
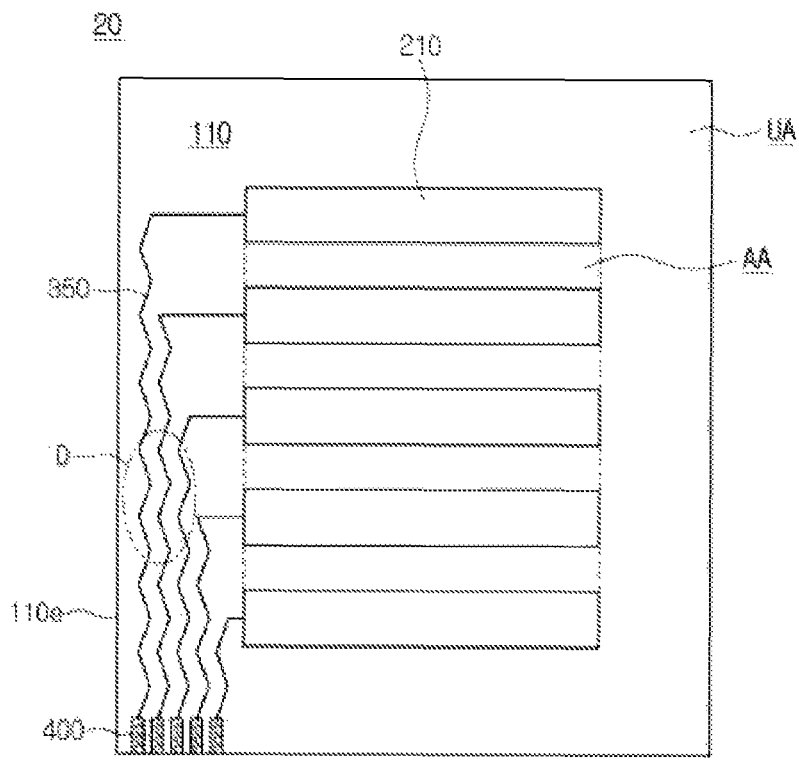
【Figure 20】
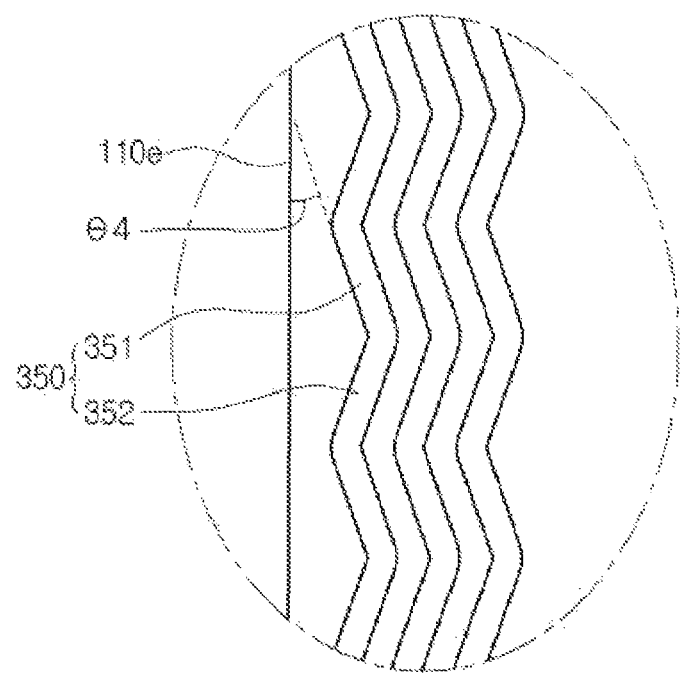

[Figure 21]
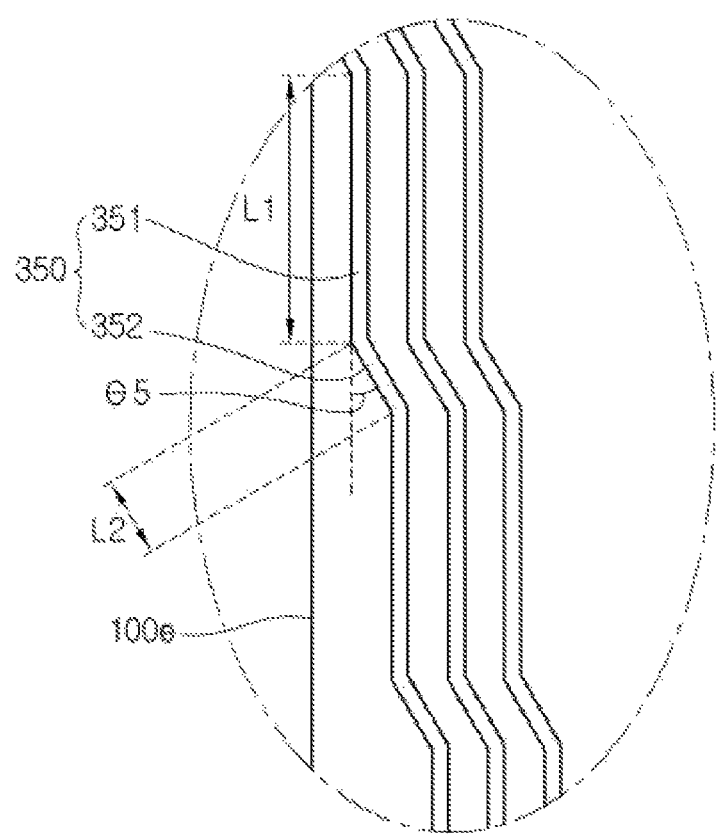

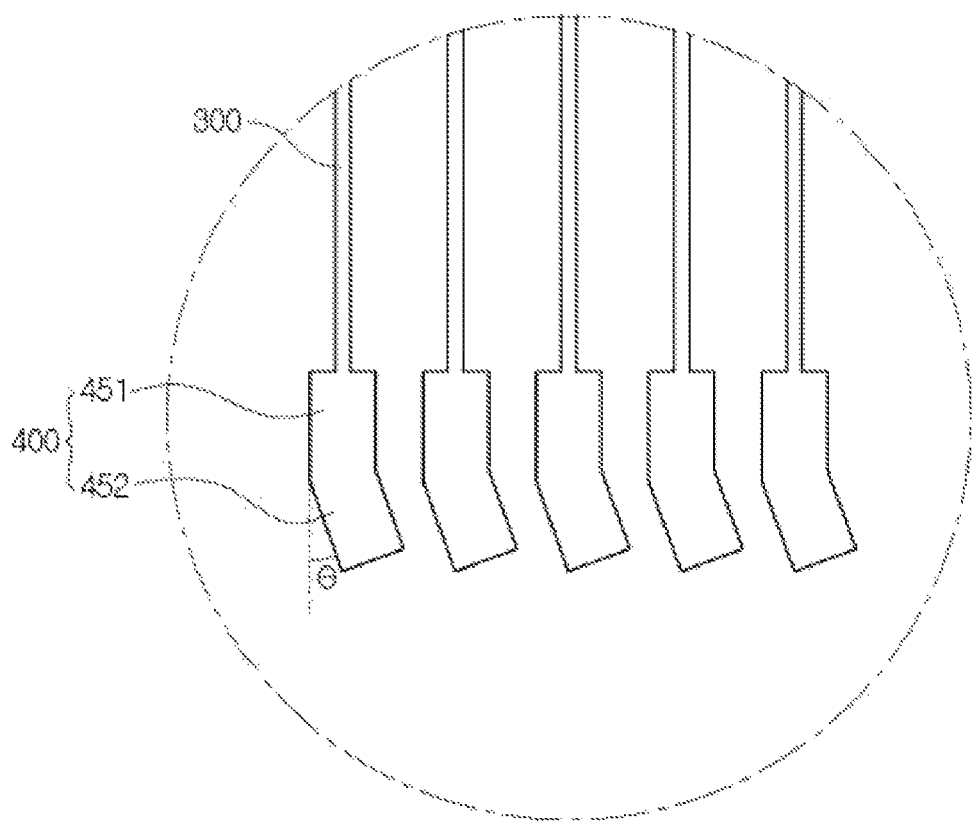
[Figure 22]

TOUCH WINDOW

CROSS-REFERENCE TO RELATED PATENT APPLICATIONS

This application is a U.S. National Stage Application under 35 U.S.C. §371 of PCT Application No. PCT/KR2014/005086, filed Jun. 10, 2014, which claims priority to Korean Patent Application No. 10-2013-0083665, filed Jul. 16, 2013, whose entire disclosures are hereby incorporated by reference.

TECHNICAL FIELD

The disclosure relates to a touch window.

BACKGROUND ART

Recently, as various portable electronic devices, such as mobile phones, PDAs, and laptop computers, have been developed, the requirement for compact-size flat panel displays applicable to the portable electronic devices is gradually increased. In this regard, the flat panel displays such as liquid crystal displays (LCDs), plasma display panels (PDPs), field emission displays (FEDs), and vacuum fluorescent displays (VFDs) have been actually studied and commercialized recently.

Metallic wiring patterns provided inside the devices or color filter patterns in the LCD have been realized through various schemes of forming patterns, such as a printing scheme and a photolithography scheme. However, according to the photolithography scheme, processes are complicated in that the photoresist must be laminated, exposed, and developed. Accordingly, the schemes have the limitation in forming fine-patterns.

Meanwhile, according to a scheme of filling a material in the pattern, the pattern is not filled with the material in uniform amount, so that the filling failure may be caused.

DISCLOSURE

Technical Problem

The embodiment provides a touch window representing an improved reliability.

Technical Solution

According to the embodiment, there is provided a touch window including a substrate, a sensing electrode on the substrate, and a wire to electrically connect the sensing electrode, and a dummy part is provided in the wire.

According to the embodiment, there is provided a touch window including a substrate, a sensing electrode on the substrate, and a wire to electrically connect the sensing electrode. The wire includes a first wire part and a second wire part adjacent to the first wire part, and the first wire part has a directionality different from a directionality of the second wire part.

Advantageous Effects

As described above, according to one embodiment, the wire of the touch window includes the dummy part. The pattern precision of the wire can be improved due to the dummy part. In particular, when the wire is formed through a scheme of filling a metallic material, the filling rate of the metallic material can be improved For example, when the wire is formed through a filling scheme based on the squeegee, the squeegee passes the wire pattern while filling the metallic material in the wire pattern. In this case, due to the dummy part, the squeegee can be prevented from being dropped into the first pattern. In addition, the dummy part serves as a step, so that the time at which the squeegee passes is prolonged, and the time, at which the metallic material is filled, is increased, so that the filling rate of the metallic material can be improved. Therefore, the wire pattern may be prevented from being disconnected, so that the electrical characteristic of the touch window can be improved.

Conventionally, when the metallic material is filled, the squeegee may be dropped into the wire pattern, so that the process efficiency may be degraded. In addition, when the pattern to be filled with the metallic material is perpendicular to the movement direction of the squeegee, the filling material may not be uniformly filled into the pattern. According to the present embodiment, the above problem can be solved due to the dummy part.

Meanwhile, according to another embodiment, the first and second wire parts inclined from the edge of the substrate are provided. Accordingly, the filling rate of the metallic material can be improved. In detail, when the wire is formed through the scheme of filling a metallic material by using the squeegee, a pattern perpendicular to the movement direction of the squeegee is not allowed, so that the metallic material can be uniformly filled.

However, according to the present embodiment, since an additional cutting work of the substrate is not required, the material efficiency can be improved, so that the productivity can be improved.

DESCRIPTION OF DRAWINGS

FIG. 1 is a schematic plan view showing a touch window according to the embodiment.

FIG. 2 is a plan view showing a touch window according to one embodiment.

FIG. 3 is an enlarged view showing a part A of FIG. 2.

FIG. 4 is a perspective view of FIG. 3.

FIG. 5 is a sectional view taken along line I-I' f FIG. 4.

FIG. 6 is a view to explain a method of fabricating the touch window according to the embodiment.

FIG. 7 is a plan view showing wires according to another embodiment.

FIG. 8 is a plan view showing the wires according to another embodiment.

FIG. 9 is a plan view showing a touch window according to another embodiment.

FIG. 10 is an enlarged view showing a part B of FIG. 9.

FIG. 11 is a view to explain a method of fabricating the touch window according to another embodiment.

FIG. 12 is an enlarged view showing the touch window according to another embodiment.

FIG. 13 is an enlarged view showing a touch window according to another embodiment.

FIG. 14 is an enlarged view showing a touch window according to another embodiment.

FIG. 15 is an enlarged view showing a touch window according to another embodiment.

FIG. 16 is an enlarged view showing a touch window according to another embodiment.

FIG. 17 is a plan view showing the touch window according to another embodiment.

FIG. 18 is an enlarged view showing a part C of FIG. 17.

FIG. 19 is a plan view showing a touch window according to another embodiment.

FIG. 20 is an enlarged view showing a part D of FIG. 19.

FIG. 21 is an enlarged view showing a touch window according to another embodiment.

FIG. 22 is an enlarged view showing a touch window according to another embodiment.

MODE FOR INVENTION

In the following description of the embodiments, it will be understood that, when a layer (or film), a region, a pattern, or a structure is referred to as being on or under another substrate, another layer (or film), another region, another pad, or another pattern, it can be directly or indirectly on the other substrate, layer (or film), region, pad, or pattern, or one or more intervening layers may also be present. Such a position of the layer has been described with reference to the drawings.

The thickness and size of each layer (or film), each region, or each structure shown in the drawings may be exaggerated, omitted or schematically drawn for the purpose of convenience or clarity. In addition, the size of each of the elements does not utterly reflect an actual size.

Hereinafter, the embodiments will be described with reference to the accompanying drawings.

FIG. 1 is a schematic plan view showing a touch window according to the embodiment. FIG. 2 is a plan view showing a touch window according to one embodiment. FIG. 3 is an enlarged view showing a part A of FIG. 2. FIG. 4 is a perspective view of FIG. 3. FIG. 5 is a sectional view taken along line I-I' of FIG. 4. FIG. 6 is a view to explain a method of fabricating the touch window according to the embodiment. FIG. 7 is a plan view showing wires according to another embodiment. FIG. 8 is a plan view showing the wires according to another embodiment. FIG. 9 is a plan view showing a touch window according to another embodiment. FIG. 10 is an enlarged view showing a part B of FIG. 9. FIG. 11 is a view to explain a method of fabricating the touch window according to another embodiment.

Referring to FIGS. 1 and 2, a touch window 10 according to the embodiment includes a substrate 100 including an active area AA, in which the position of an input device (e.g., finger) is sensed, and an unactive area UA provided around the active area AA.

The substrate 100 may include a glass substrate or a plastic substrate including poly(ethylene terephthalate) (PET) or resin. However, the embodiment is not limited thereto, but the substrate 100 may include various materials sufficient to form a sensing electrode 200 and a wire 300 formed on the substrate 100.

The sensing electrode 200 may be formed in the active area AA to sense the input device. Although FIG. 2 shows that the sensing electrode 200 is in the shape of a bar, the embodiment is not limited thereto. Accordingly, the sensing electrode 200 may be formed in various shapes to sense the touch of the input device such as the finger.

The sensing electrode 200 may include a transparent conductive material to allow electricity to flow while not interrupting the transmission of light. To this end, the sensing electrode 200 may include various materials such as indium tin oxide (ITO), indium zinc oxide (IZO), copper oxide ($Cu_2O$), carbon nano-tube (CNT), conductive polymer, and nano-wires.

In addition, the sensing electrode 200 may include various metallic materials such as silver (Ag), gold (Au), and copper (Cu), and may include a conductive pattern. In other words, when the sensing electrode 200 includes a metallic material, the sensing electrode 200 may have the shape of a mesh.

Although FIG. 2 shows that the sensing electrode 200 extends in one direction, the embodiment is not limited thereto. Accordingly, the sensing electrode 200 may include two types of sensing electrodes extending in one direction and extending in a different direction crossing the one direction.

When the input device such as the finger is touched on the above touch window, the variation in capacitance occurs in the touch point of the input device, and a part, in which the variation in capacitance occurs, may be detected as the position of the touch point.

A wire 300 may be formed in the unactive area UA for the electrical connection of the sensing electrode 200. The wire 300 may include metal representing superior electric conductivity. For example, the wire 200 may include chrome (Cr), nickel (Ni), copper (Cu), aluminum (Al), silver (Ag), molybdenum (Mo), and the alloy thereof. In particular, the wire 300 may include various metallic paste materials allowing the formation of the wire through a printing process.

Electrode pads 400 are located at the end of the wire 300. The electrode pads 400 may be connected with a printed circuit board. In detail, although not shown in accompanying drawings, a connector is located on one surface of the printed circuit board, and the electrode pads 400 may be connected with the connectors. The electrode pads 400 may be formed in size corresponding to that of the connector.

The printed circuit board may include various types of printed circuit boards. For example, the printed circuit board may include a flexible printed circuit board (FPCB).

Meanwhile, referring to FIGS. 3 to 5, the wire 300 may extend in a longitudinal direction of the substrate 100. The wire 300 has a first pattern P1 extending in the longitudinal direction of the substrate 100.

The first pattern P1 may be an intaglio pattern. In other words, the first pattern P1 may have a predetermined depth in a depth direction of the substrate 100. In detail, referring to FIG. 5, the substrate 100 may include a film member 101 and a resin layer 102 provided on the film member 101, and the first pattern P1 may be formed in the resin layer 102. As shown in FIG. 5, an electrode material is filled in the intaglio pattern, thereby forming the wire 300.

The wire 300 includes a dummy part 310. In detail, the dummy part 310 is provided in the wire 300. In more detail, the dummy part 310 is provided within the line width of the wire 300. In other words, the dummy part 310 is provided in the first pattern P1. Accordingly, the dummy part 310 is provided in the intaglio pattern.

The dummy part 310 has a second pattern P2. The second pattern P2 may be an emboss pattern. In other words, the second pattern P2 may have a predetermined height in the first pattern P1. The second pattern P2 may have repeated patterns.

For example, as shown in FIG. 4, the dummy part 310 may have the shape of a square column. However, the embodiment is not limited thereto, and the dummy part 310 may have the shape of a prism such as a cylinder, a pentagonal column, or a hexagonal column. In addition, the dummy part 310 may include a plurality of protrusions.

The pattern precision of the wire 300 may be improved due to the dummy part 310. In particular, when the wire 300 is formed through a scheme of filling a metallic material 300' the filling rate of the metallic material 300' can be improved. For example, referring to FIG. 6, when the wire 300 is formed through a filling scheme based on a squeegee 1, the squeegee 1 passes the first pattern P1 (in an arrow direction) while filling the metallic material 300'. In this case, due to the dummy part 310, the squeegee 1 can be prevented from being dropped into the first pattern P1. In addition, the dummy part 310 serves as a step, so that the time at which the squeegee 1 passes is prolonged, and the time, at which the metallic material 300' is filled, is increased, so that the filling rate of the metallic material 300' may be improved. Therefore, the pattern of the wire 300 may be prevented from being disconnected, so that the electrical characteristic of the touch window can be improved.

Conventionally, when the metallic material is filled, the squeegee 1 may be dropped into the first pattern P1, so that the process efficiency may be degraded. In addition, when the pattern to be filled with the metallic material is perpendicular to the movement direction of the squeegee 1, the filling material may not be uniformly filled into the pattern.

The above problems may be overcome due to the dummy part 310 in the present embodiment.

Hereinafter, the wire 300 according to another embodiment will be described with reference to FIG. 7. According to another embodiment, a dummy part 320 having a third pattern P3 is located in the wire 300 having the first pattern P1. In this case, the third pattern P3 is inclined together with the first pattern P1. In detail, at least one surface of the dummy part 320 is inclined together with the wire 300. At least one surface of the dummy part 320 may form a first angle θ1 together with one surface of the wire 300. The first angle θ1 may be in the range of 0.1° to 50°. Preferably, the first angle θ1 may be in the range of 1° to 10°. The filling rate of the metallic material formed in the first pattern P1 can be improved due to the dummy part 320 inclined at the first angle θ1.

Hereinafter, the wire 300 according to another embodiment will be described with reference to FIG. 8. According to another embodiment, the wire 300 includes a first wire part 301 and a second wire part 302. The second wire part 302 is bent from the first wire part 301 while extending from the first wire part 301. In other words, the second wire part 302 may be bent at a specific angle with respect to the first wire part 301, and the details thereof will be described below. Dummy parts 331 and 332 having fourth patterns P4 are located in the first and second wire parts 301 and 302.

Hereinafter, a touch window according to another embodiment will be described with reference to FIGS. 9 to 11. A touch window 20 according to another embodiment includes a substrate 110, a sensing electrode 210, a wire 350, and an electrode pad 410. In this case, the wire 350 includes first and second wire parts 351 and 352.

The first wire pare 351 is inclined from an edge 110e of the substrate 110. In other words, the first wire part 351 is tilted from the edge 110e of the substrate 110.

The second wire part 352 extends from the first wire part 351. The first wire part 351 has the directionality different from that of the second wire part 352. In other words, the extension direction of the first wire part 351 is different from that of the second wire part 352. In detail, when the first wire part 351 extends in one direction, the second wire part 352 may have the shape extending in another direction crossing the one direction.

For example, the second wire part 352 is bent from the first wire part 351. Accordingly, the second wire part 352 may be bent at a specific angle from the first wire part 351. The second wire part 352 is inclined from the edge 110e of the substrate 110. In other words, the second wire part 352 is tilted from the edge of 110e of the substrate 110. The second wire part 352 and the edge 110e of the substrate 110 may form a second angle θ2. The second angle θ2 may be in the range of 0.1° to 50°. Preferably, the second angle θ2 may be in the range of 1° to 10°.

The first and second wire parts 351 and 353 may be repeatedly arranged. In other words, the first and second wire parts 351 and 352 may be alternately aligned with each other. The first wire part 351 and the second wire part 352 may be periodically repeated.

As the first and second wire parts 351 and 352 are inclined from the edge 110e of the substrate 110, the filling rate of the metallic material constituting the first and second wire parts 351 and 352 can be improved. In detail, as shown in FIG. 11, when the wire 350 is formed through the scheme of filling a metallic material by using the squeegee 1, a pattern perpendicular to the movement direction (arrow direction) of the squeegee 1 is not allowed, so that the metallic material can be uniformly filled.

Meanwhile, conventionally, in order to improve the filling rate of the metallic material, a linear-type wire pattern is tilted from the movement direction of the squeegee 1 and filled with the metallic material. In this case, although the filling rate is improved, the substrate must be cut according to the tilting angle. Accordingly, the substrate area may be lost.

However, according to the present embodiment, since an additional cutting work of the substrate is not required, the material efficiency can be improved, so that the productivity can be improved.

Hereinafter, a touch window according to another embodiment will be described with reference to FIGS. 12 to 16. FIG. 12 is an enlarged view showing the touch window according to another embodiment. FIG. 13 is an enlarged view showing a touch window according to another embodiment. FIG. 14 is an enlarged view showing a touch window according to another embodiment. FIG. 15 is an enlarged view showing a touch window according to another embodiment. FIG. 16 is an enlarged view showing a touch window according to another embodiment.

Referring to FIG. 12, a wire 360 included in a touch window according to another embodiment includes a first wire part 361 and a second wire part 362, and the first and second wire parts 361 and 362 are not linear. In other words, the first and second wire parts 361 and 362 include curved lines. The first and second wire parts 361 and 362 have mutually different directionalities. In other words, the curving direction of the first wire part 361 may be different from the curving direction of the second wire part 362.

Referring to FIG. 13, a wire 370 included in a touch window according to another embodiment includes first and second wire parts 371 and 372, and the first and second wire parts 371 and 372 may include mutually different types of lines. For example, as shown in FIG. 13, the first wire part 371 may include a curved line, and the second wire part 372 may include a linear line. However, the embodiment is not limited thereto, and the first and second wire parts 371 and 372 may include various types of lines.

Referring to FIG. 14, a wire 380 included in a touch window according to another embodiment includes first and second wire parts 381 and 382, and the length of the first wire part 381 is different from the length of the second wire part 382. For example, as shown in FIG. 14, the length L1 of the first wire part 381 may be longer than the length L2 of the second wire part 382. However, the embodiment is not limited thereto, and the first and second wire parts 381 and 382 may have various lengths.

Referring to FIG. 15, a wire 390 included in a touch window according to another embodiment includes a first wire part 391, a second wire part 392, and a third wire part 393. The first to third wire parts 391, 392, and 393 may include mutually different types of lines. For example, as shown in FIG. 15, the first and second wire parts 391 and 392 may include lines curved in mutually different directions, and the third wire part 393 may include a linear line.

Referring to FIG. 16, a wire 330 included in a touch window according to another embodiment may be tilted from a mother substrate 120. In addition, the sensing electrode 220 may be tilted from the mother substrate 120. In other words, the linear-type wire pattern may be titled from the movement direction of the squeegee 1 and filled with the metallic material, and the filling rate of the metallic material can be improved. Accordingly, the filling rate in the wire pattern can be improved. After filling the metallic material, the mother substrate 120 may be cut at the tilting angle of the wire.

Meanwhile, referring to FIGS. 17 and 18, an electrode pad 400 of a touch window according to another embodiment includes a dummy part 410.

The dummy part 410 is provided in the electrode pad 400. The dummy part 410 is provided within the line width of the electrode pad 400.

The electrode pad 400 may be formed by filling a conductive material in an intaglio pattern. In this case, the dummy part 410 may be provided in the intaglio pattern. The dummy part 410 may have an emboss pattern. Accordingly, the dummy part 410 may have a predetermined height in the intaglio pattern. The dummy part 410 may have a repeated pattern.

The dummy part 410 is inclined from an edge 100e of the substrate 100. In other words, the dummy part 410 is tilted from the edge 100e of the substrate 100. The dummy part 410 may form a third angle θ3 together with the edge 100e of the substrate 100. The third angle θ3 may be in the range of 10 degrees to 170 degrees.

Meanwhile, referring to FIGS. 19 and 20, the wire 350 of the touch window according to another embodiment includes first and second wire parts 351 and 352.

The first wire part 351 is inclined from the edge 110e of the substrate 110. In other words, the first wire part 351 is tilted from the edge 110e of the substrate 110.

The second wire part 352 extends from the first wire part 351. The first wire part 351 has the directionality different from that of the second wire part 352. In other words, the extension direction of the first wire part 351 is different from that of the second wire part 352. In detail, when the first wire part 351 extends in one direction, the second wire part 352 may have the shape extending in another direction crossing the one direction.

For example, the second wire part 352 is bent from the first wire part 351. Accordingly, the second wire part 352 may be bent at a specific angle from the first wire part 351. The second wire part 352 is inclined from the edge 110e of the substrate 110. In other words, the second wire part 352 is tilted from the edge of 110e of the substrate 110. The second wire part 352 and the edge 110e of the substrate 110 may form a fourth angle θ4. The fourth angle θ4 may be in the range of 10° to 170°.

The first and second wire parts 351 and 353 may be repeatedly arranged. In other words, the first and second wire parts 351 and 352 may be alternately aligned with each other. The first wire part 351 and the second wire part 352 may be periodically repeated.

Meanwhile, referring to FIG. 21, the length L1 of the first wire part 351 of the touch window according to another embodiment may be different from the length L2 of the second wire part 352. The length L1 of the first wire part 351 may be longer than the length L2 of the second wire part 352.

Meanwhile, the first wire part 351 may be arranged parallel to the edge 110e of the substrate 110. Unlike, the second wire part 352 is bent from the first wire part 351. Accordingly, the second wire part 352 may be bent at a specific angle from the first wire part 351. The first and second wire parts 351 and 352 may form a fifth angle θ5. The fifth angle θ5 may be in the range of 10° to 170°.

Meanwhile, referring to FIG. 22, the electrode pad 400 may include a first electrode pad 451 and a second electrode pad 452. The first electrode pad 451 may have a directionality different from that of the second electrode pad 452. The second electrode pad 452 may be inclined from the first electrode pad 451. The angle between the second electrode pad 452 and the first electrode pad 451 may be in the range of 10 degrees to 170 degrees.

The touch window is applicable to the interior of a vehicle as well as a display of a mobile terminal. In other words, the touch window is applied not only to a personal navigation display (PND) of a vehicle navigation system, but also to a dashboard, so that a center information display (CID) can be realized. However, the embodiment is not limited thereto, and the display is usable for various electronic products.

INDUSTRIAL APPLICABILITY

As described above, according to one embodiment, the wire of the touch window includes the dummy part. The pattern precision of the wire can be improved due to the dummy part.

In particular, when the wire is formed through a scheme of filling a metallic material, the filling rate of the metallic material can be improved.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
  a substrate;
  a sensing electrode on the substrate; and
  a wire to electrically connect the sensing electrode,
  wherein the wire is provided therein with a dummy part,
  wherein the wire has a first pattern and the dummy part has a second pattern in the wire, wherein the second pattern is inclined with respect to the first pattern, at least one surface of the dummy part form a first angle θ1 together with one surface of the wire, and wherein the first angle θ1 is in a range of 0.1° to 50°.

2. The touch window of claim 1, wherein the first pattern is an intaglio pattern, and the second pattern is an emboss pattern.

3. The touch window of claim 1, wherein the dummy part comprises a plurality of protrusions.

4. The touch window of claim 1, wherein the wire comprises a first wire part and a second wire part adjacent to the first wire part, and the first wire part has a directionality different from a directionality of the second wire part.

5. The touch window of claim 4, wherein the second wire part is bent from the first wire part while extending from the first wire part.

6. The touch window of claim 4, wherein the directionality of the first wire part or the second wire part is different from a directionality of the sensing electrode.

7. The touch window of claim 1, wherein the wire includes chrome (Cr), nickel (Ni), copper (Cu), aluminum (Al), silver (Ag), molybdenum (Mo), or the alloy thereof.

8. The touch window of claim 1, wherein the wire includes a metal paste material.

9. The touch window of claim 1, an electrode pad provided at an end of the wire and connected with a circuit board.

10. A touch window comprising:
a substrate;
a sensing electrode on the substrate;
a wire to electrically connect the sensing electrode; and
an electrode pad provided at an end of the wire and connected with a circuit board,
wherein the electrode pad is provided therein with a dummy part,
wherein an angle between the electrode pad and the dummy part is in a range of 10° to 170°.

11. The touch window of claim 10, wherein the wire comprises a first wire part and a second wire part adjacent to the first wire part, and the first wire part has a directionality different from a directionality of the second wire part, wherein an angle between the first and second wire parts is in a range of 10° to 170°.

12. The touch window of claim 11, a length of the first wire part is different from a length of the second wire part.

13. The touch window of claim 10, wherein a line width of the electrode pad is larger than a line width of the wire.

14. The touch window of claim 10, wherein the electrode pad is formed by filling a conductive material in an intaglio pattern.

15. The touch window of claim 10, wherein the electrode pad includes a metal paste material.

16. The touch window of claim 10, wherein the wire includes chrome (Cr), nickel (Ni), copper (Cu), aluminum (Al), silver (Ag), molybdenum (Mo), or the alloy thereof.

17. A touch window comprising:
a substrate;
a sensing electrode on the substrate;
a wire to electrically connect the sensing electrode; and
an electrode pad provided at an end of the wire and connected with a circuit board,
wherein the electrode pad is provided therein with a dummy part,
wherein the electrode pad comprises a first electrode pad and a second electrode pad having mutually different directionalities.

18. The touch window of claim 17, an angle between the second electrode pad and the first electrode pad is in a range of 10° to 170°.

19. The touch window of claim 17, wherein at least one of the first and second electrode pads is inclined from an edge of the substrate.

20. The touch window of claim 17, wherein the directionality of the first electrode pad or the second electrode pad is different from a directionality of the sensing electrode.

* * * * *